(12) United States Patent
Schaefer et al.

(10) Patent No.: US 8,617,739 B2
(45) Date of Patent: Dec. 31, 2013

(54) GALVANIC CELL FOR AN ACCUMULATOR

(71) Applicant: Li-Tec Battery GmbH, Kamenz (DE)

(72) Inventors: Tim Schaefer, Harztor (DE); Andreas Gutsch, Luedinghausen (DE)

(73) Assignee: Li-Tec Battery GmbH, Kamenz (DE)

( * ) Notice: Subject to any disclaimer, the term of this patent is extended or adjusted under 35 U.S.C. 154(b) by 0 days.

(21) Appl. No.: 13/794,675

(22) Filed: Mar. 11, 2013

(65) Prior Publication Data

US 2013/0196213 A1    Aug. 1, 2013

Related U.S. Application Data

(63) Continuation of application No. 12/604,552, filed on Oct. 23, 2009, now Pat. No. 8,394,527.

(30) Foreign Application Priority Data

Oct. 23, 2008   (DE) .......................... 10 2008 053 011

(51) Int. Cl.
*H01M 2/00*   (2006.01)
(52) U.S. Cl.
USPC ........... 429/163; 429/120; 429/121; 429/141; 429/142; 429/144; 429/168; 429/169; 429/170; 429/176
(58) Field of Classification Search
USPC ......... 429/120–122, 138, 141–142, 144, 148, 429/163, 168–170, 176
See application file for complete search history.

(56) References Cited

U.S. PATENT DOCUMENTS

| | | | |
|---|---|---|---|
| 4,241,829 A | 12/1980 | Hardy | |
| 4,253,892 A | 3/1981 | D'Angelo et al. | |
| 4,664,994 A | 5/1987 | Koike et al. | |
| 5,644,212 A | 7/1997 | Takahashi | |
| 5,739,671 A | 4/1998 | Hamada | |
| 5,795,664 A | 8/1998 | Kelly | |
| 5,871,861 A | 2/1999 | Hirokou et al. | |
| 6,391,491 B1 | 5/2002 | Kim | |
| 2003/0215702 A1 | 11/2003 | Tanjou et al. | |
| 2003/0224246 A1 | 12/2003 | Watanabe et al. | |

(Continued)

FOREIGN PATENT DOCUMENTS

| | | | |
|---|---|---|---|
| AU | B1723383 A | 2/1984 | |
| AU | 556049 B2 | 10/1986 | |

(Continued)

OTHER PUBLICATIONS

European Search Report EP09012720 published Apr. 19, 2010.

(Continued)

*Primary Examiner* — Patrick Ryan
*Assistant Examiner* — Ben Lewis
(74) *Attorney, Agent, or Firm* — Choate, Hall & Stewart LLP; Andrea L. C. Robidoux; Daniel S. Matthews

(57) ABSTRACT

The galvanic cell according to the invention comprises at least one current conductor and a casing. Said casing at least partially surrounds said galvanic cell. A contact area is assigned to said casing. The casing is at least partially materially engaged with the current conductor via the contact area. The casing comprises at least one first layer and one second layer. The materials of said first layer and said second layer of the casing are different in respect to at least one chemical material.

11 Claims, 2 Drawing Sheets

(56) References Cited

U.S. PATENT DOCUMENTS

Figure 1:
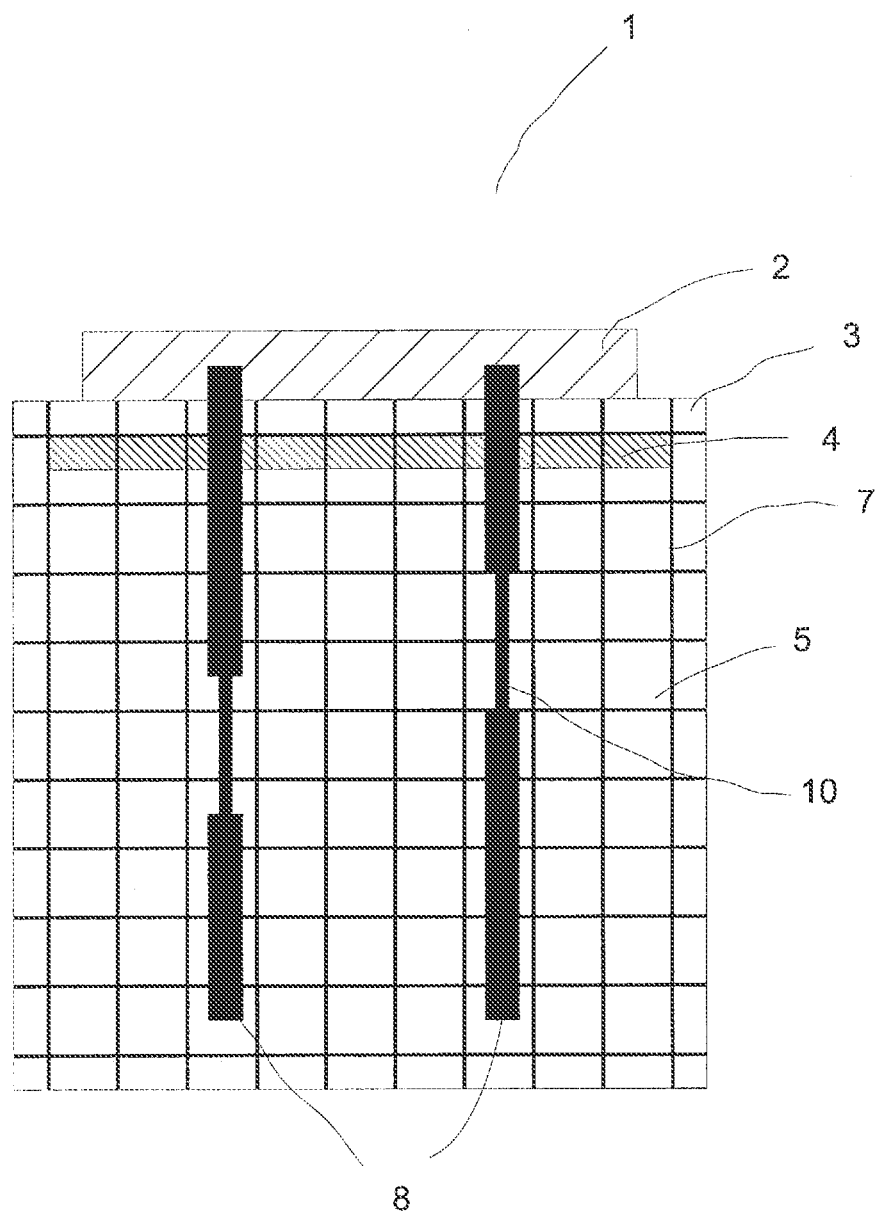

| | | |
|---|---|---|
| 2004/0257042 A1 | 12/2004 | Liu et al. |
| 2006/0073383 A1 | 4/2006 | Han et al. |
| 2006/0134515 A1 | 6/2006 | Kumashiro et al. |
| 2006/0137175 A1 | 6/2006 | Hayashi et al. |
| 2007/0055951 A1 | 3/2007 | Hayashi et al. |
| 2007/0095711 A1 | 5/2007 | Thompson et al. |
| 2008/0044727 A1* | 2/2008 | Suzuki et al. .............. 429/218.1 |
| 2008/0054849 A1 | 3/2008 | Kim |
| 2008/0274394 A1 | 11/2008 | Schormann |
| 2009/0098443 A1 | 4/2009 | Yamamoto et al. |
| 2010/0159306 A1 | 6/2010 | Leuthner |

FOREIGN PATENT DOCUMENTS

| | | |
|---|---|---|
| DE | 19541959 A1 | 5/1996 |
| DE | 10202807 A1 | 8/2003 |
| DE | 102005042916 A1 | 3/2007 |
| DE | 102007002444 A1 | 7/2008 |
| EP | 0570590 A1 | 11/1993 |
| EP | 586232 A2 | 3/1994 |
| EP | 0862230 A2 | 9/1998 |
| EP | 0949699 A2 | 10/1999 |
| EP | 1020943 A1 | 7/2000 |
| EP | 1079450 A1 | 2/2001 |
| EP | 1085592 A2 | 3/2001 |
| EP | 1146579 A2 | 10/2001 |
| EP | 1976043 A1 | 10/2008 |
| EP | 1981100 A1 | 10/2008 |
| JP | 59146166 A | 8/1984 |
| JP | 2000328159 A | 11/2000 |
| JP | 2002266041 A | 9/2002 |
| JP | 2003257418 A | 9/2003 |
| JP | 2005071784 A | 3/2005 |
| JP | 2006066083 A | 3/2006 |
| WO | WO-03015192 A2 | 2/2003 |
| WO | WO-2005042374 A1 | 5/2005 |
| WO | WO-2005122294 A1 | 12/2005 |
| WO | WO-2008004161 A2 | 1/2008 |

OTHER PUBLICATIONS

European Search Report EP09013438 published Jul. 1, 2010.
European Search Report for EP 09008936 published Oct. 14, 2009.
European Search Report for EP09012719 published Mar. 5, 2010.
European Search Report for EP09012719 published May 19, 2010.
European Search Report for EP09013438 published Feb. 16, 2010.
European Search Report for EP09013439 published Dec. 12, 2009.
European Search Report for EP09013439 published Feb. 16, 2010.
European Search Report for EP09014759 published Jan. 25, 2010.
International Search Report for PCT/EP2008/010035 published Mar. 11, 2009.
Technical data sheet: PE Polyethylene, Jan. 7, 2010, Merk & Partner GmbH, XP002562200.
Technical data sheet: PET Polyethylenterephtalate, Jan. 7, 2010, Merk & Partner GmbH, XP002562120.
Technical data sheet: PP Polpropylene, Jan. 7, 2010, Merk & Partner GmbH, XP002562121.

* cited by examiner

GALVANIC CELL FOR AN ACCUMULATOR

CROSS-REFERENCE TO RELATED APPLICATIONS

The present application is a continuation of U.S. patent application Ser. No. 12/604,552, filed Oct. 23, 2009, the entire content of which is hereby incorporated by reference. The present application also claims priority to German Patent Application No. DE 10 2008 053 011.5, filed Oct. 23, 2008, the entire content of which is hereby incorporated by reference.

The present invention relates to a galvanic cell for an accumulator. The invention is described in the context of lithium-ion accumulators for powering electric vehicles. It is noted that the invention may be used independent from the set-up of the accumulator or independent of the type of powered engine.

Accumulators comprising a plurality of galvanic cells for powering electric vehicles are known from the prior art. For some of these embodiments, it is common that the environment of these accumulators is possibly endangered by material leakage from the inner cell after failure of a galvanic cell.

Therefore, one object of the present invention is to avoid the leakage of components of a galvanic cell as a consequence of a failure or damage to the cell. In accordance with the present invention, this object is achieved by the subject-matter of the independent claims. Preferred embodiments of the invention are the subject-matter of the dependent claims.

The galvanic cell according to the invention comprises at least one current conductor and one casing. Said casing at least partially surrounds said galvanic cell. The casing comprises a contact area. Inside said contact area, the casing is at least partially connected with the current conductor by material engagement. The casing comprises at least one first layer and at least one second layer. The material of said first layer and the material of said second layer of the casing are different in respect to at least one chemical substance.

In the present case, a galvanic cell is a device for storing energy. A supplied amount of electrical energy is converted into chemical energy upon storage in the galvanic cell. The stored chemical energy is, in a first step, re-converted into electrical energy upon energy consumption, for example for supplying power to the drive of a vehicle. Typically, a galvanic cell comprises two electrodes and one electrolyte for providing ionic conduction between these electrodes. An electrode of the galvanic cell according to the invention comprises an active electrode mass for storing energy in chemical form. The galvanic cell may fail after an un-planned change to the cell chemistry. Also, the electrolyte may be damaging for the environment.

The galvanic cell according to the present invention comprises at least one current conductor. Herein, a current conductor is understood to be a device that is at least in electrical contact with an active electrode mass of the galvanic cell. The current conductor supplies or withdraws electrons to or from this active electrode mass. The current conductor is connected with an electrical cable for conducting electrons. Such a current conductor may be assigned to the anode or to the cathode of the galvanic cell. Preferably, the galvanic cell comprises a respective current conductor for each active electrode mass. The current conductor may be present, for example, in the form of a metal foil. However, other geometries and/or other electrically conducting materials may be used corresponding to the requirements to be met by the galvanic cell or the accumulator, respectively.

Furthermore, the galvanic cell according to the invention comprises a casing. Said casing has the purpose of separating the chemically active and energy storing parts of the galvanic cell from the environment. Thereby, the exchange of chemical substances between the galvanic cell and the environment is largely avoided. In particular for galvanic cells, in which the electrolyte comprises lithium-ions, any interaction with water is undesirable, not the least because of strong chemical reactions. Therefore, the casing, by way of example, serves the purpose of avoiding the access of water or water vapor, respectively, to the largest extent. Access into the inside of the galvanic cell is also avoided in regard to other damaging chemical substances. The casing also counteracts the leakage of chemical substances from the galvanic cell. For example, this set-up avoids that the electrolyte or other chemical substances of the galvanic cell interact with the environment. The galvanic cell is at least partially enclosed by a casing. Preferably, the casing encloses the galvanic cell almost completely. Preferably, only at least one electrical conductor, which is in electrical operative connection with a current conductor protrudes out of the galvanic cell out of the casing, or at least said current conductor.

The casing comprises a contact area. Within this contact area, the casing is at least partially connected with the current conductor. Said partial connection serves the purpose of sealing the casing and/or the galvanic cell against the environment. It is preferred that this connection is achieved by means of material engagement. Establishing the connection of the casing with the at least one current conductor also depends on the used materials. For example, a connection by material engagement can be achieved by means of adhesives or by means of using a welding process. In case the casing comprises plastic materials, connection by means of material engagement can be achieved, for example, by means of ultrasonic welding. It is not necessary that the casing is connected with the at least one current conductor across the entire area. A strip-like connection along a free edge of the casing with the at least one current conductor may be sufficient for sealing purposes.

The casing comprises at least one first layer and at least one second layer. These layers are preferably formed as full areas and are connected with each other by means of material engagement so that an array of layers ensues. However, it is not necessary that both layers for the casing are realized as "full areas" in order to achieve the requirements. The thicknesses of the layers are to be chosen to meet the requirements. The formation of different layers is meant to fulfill several different requirements that are to be met by the casing. Preferably, the outer layer serves the purpose of sealing while the inner layer is inert or resistant vis-à-vis the cell chemistry. Preferably, one of these layers is impermeable in respect to water vapor at ambient pressure. Therein, "ambient pressure" relates to such pressure regimes that rule the galvanic cell during operation of the same or to which galvanic cells are exposed during other periods of time.

The material of said first layer and the material of said second layer are different from each other in respect to at least one chemical substance. Said chemical substance is meant to be a pure substance, i.e. an element or a compound or a homogenous or heterogeneous, respectively, mixture of substances. Thereby, the layers can fulfill the different tasks. In a preferred embodiment, the outer layer comprises a metal, for example, in order to further support the sealing properties of the casing. The outer layer is covered in regard to the cell chemistry by means of the inner layer so that a chemical interaction between the cell chemistry and the outer layer is avoided. Preferably, the inner layer comprises a chemical substance that enhances the resistance of said layer against the cell chemistry.

Thereby, the leakage of content of the galvanic cell according to the invention is avoided, the intrusion of an unwanted substance into the galvanic cell is avoided and the object according to the invention is solved.

In the following, preferred embodiments of the invention are described.

Preferably, at least one of the layers comprises two different materials. This allows for bringing a layer of the casing in particular accordance with the requirements.

Preferably, particles of a second material are embedded in the first material of the layer. The first and second material of said layer have different geometries depending on the requirements. These two materials may be processed simultaneously to lead to the first layer. Preferably, one material is arrayed or embedded in a device provided for that purpose prior to adding the other material. Preferably, one material has a higher thermal conductivity than the other material, without being electrically conducting. Preferably, different polymers are used as first and second material. Therein, one polymer is less susceptible to attack by the chemical substances of the galvanic cell than the other polymer, which has better sealing properties and/or is more cost-effective. For example, the polymers are taken from a group comprising polypropylene (PP), polyethylene (PE) and polyvinylchloride (PVC).

Preferably, the second material has a higher module of elasticity than the first material. The second material is preferably present in the shape of rods, particularly preferred as thin and short fibers. The fibers are engaged with the first material in at least partial material engagement. Therein, the first material provides material engagement between separate fibers or groups of fibers, respectively. Therein, the fibers are at least partially enclosed by the first material. Preferably, these fibers are at least partially connected with each other to result in at least one first strand-like entity. A first strand-like entity is thin or has a diameter that is small compared to its length, respectively. The diameter of a first strand-like entity preferably is less than $1/10$ of its length, particularly preferred less than $1/100$ of said length. Preferably, a plurality of first strand-like entities are in a relationship with each other, respectively. Several first strand-like entities, for example, are interweaved with each other similar to textiles. Preferably, several first strand-like entities are arrayed as layered multi-layers, wherein the orientation of different layers of a multi-layer are different with respect to each other. Particular preferred are orientations of the layers of a multi-layer or a mesh so that the layers are arranged essentially perpendicular to each other. However, respective angles of 30°, 45°, 60° between these orientations provide particular advantages in regard to the uptake of force or in respect to other mechanical properties of a multi-layer or a mesh. Preferably, within a casing, several of these first strand-like entities are arrayed in the direction of tensile forces. Preferably, a significant distance exists between two of these first strand-like entities in regard to their respective diameter. Preferably, several first strand-like entities are arranged together in a web-like manner. Preferably, the second material is selected from the group comprising glass, carbon or aramide. Preferred first materials are hardenable polymers, for example EP, UP.

Preferably at least one first device for conducting electrical current is assigned to the casing. The first device for conducting electrical current is at least indirectly electrically connected to a current conductor. Preferably, for each current conductor that is present, a first device for conducting electrical current is assigned to the casing. Preferably, such a first device for conducting electrical current is realized as a metallic flat lead that is at least partially enclosed by the casing. The first device for conducting electrical current can also be arranged on the outer surface of the casing. In a particularly preferred embodiment, the device for conducting electrical current is at least partially connected with the casing in material engagement. Preferably, the device for conducting electrical current is at least partially electrically isolated in regard to the environment. In case the casing of the galvanic cell is destroyed or at least partially damaged, this leads to a damaging of the device for conducting electrical current, with a high probability. Thereafter, energy exchange with the galvanic cell is no longer possible.

Preferably, this at least one first device for conducting electrical current is realized with a material that has a lower degree of elongation at fracture than the materials of the casing. Furthermore, said at least one first device for conducting electrical current is preferably connected in material engagement with the casing. In case the casing stretches, preferably the conductive cross-section of the first device for conducting electrical current diminishes. Thereby, the respective electrical resistance increases. In case the casing stretches significantly, upon proper selection of the material or the geometry, respectively, the first device for conducting electrical current ruptures. A first device for conducting electrical current particularly preferably comprises at least one thin area that is arranged in a part of the casing that may stretch particularly strongly. Thereby, the device for conducting electrical current ruptures before the casing fails. After the rupture of the first device for conducting electrical current, no more electrical energy can be exchanged via the galvanic cell. This is advantageous in case the casing strongly stretches, for example as the consequence of a strong increase in temperature or a significant formation of gas inside the casing.

Preferably, the casing comprises at least one first sensor device. Preferably a first sensor device is understood to be, for example, a temperature measuring device, a piezo-element, a resistance strain gauge or any other measuring device that provides information about an unwanted state of operation of the galvanic cell. This may also be a device that is provided on the outer surface of the casing that reacts to the presence of chemicals from the inner part of the cell. Preferably, the sensor device is connected in material engagement with the casing. The first sensor device is preferably connected to a memory device or a control unit, respectively. The same can be assigned to the respective galvanic cell, a group of galvanic cells or also the accumulator.

Preferably, an accumulator comprises at least one galvanic cell according to the invention, or one of the preferred embodiments thereof, together with at least one wall. This wall also serves the purpose of protecting the at least one galvanic cell from damaging mechanical impact. The wall is preferably formed alongside the outer surfaces of the galvanic cells contained therein, which are subjected to particular potential damages. Preferably, the wall is insulated in regard to heat, flame retardant and/or resistant against chemicals which may be formed by a galvanic cell or the encasing thereof, respectively. The strength of the wall is preferably chosen in a manner so that the respective needs are met.

Preferably, the at least one wall comprises two different materials. Thereby, it is possible to bring the wall into accordance with the requirements in a particularly suitable manner. The third and the fourth material of this layer have different geometries based on the respective requirements. Preferably, particles of a fourth, mechanically particularly resilient materials are embedded in the third material of the wall. These two materials may be processed simultaneously leading to said wall. Preferably, one material is arrayed or embedded in a suitable device prior to adding the other material. Preferably, one material has a higher thermal conductivity than the other material.

Preferably, said fourth material has a higher module of elasticity than the third material. Geometrically, the fourth material is preferably present as a strand-like entity, particularly preferred as thin and short fibers. The fibers are connected with the third material at least partially in material engagement. Therein, the third material provides material engagement between individual fibers or groups of fibers, respectively. Therein, the fibers are at least partially enclosed by the third material. Preferably, the fibers are at least partially connected with each other leading to second strand-like entities. These second strand-like entities are thin or have a comparatively low diameter compared to their length, respectively. The diameter of the second strand-like entity preferably is less than 1/10 of its length, particularly preferred less than 1/100 of its length. Preferably, a plurality of second strand-like entities are positioned in a specific orientation to each other, respectively. A plurality of such second strand-like entities preferably are interwoven with each other, similar to textiles. Preferably, several second strand-like entities may be arranged as layers in a multi-layer, wherein the orientation of different layers within a multi-layer is different from each other, respectively. Particular preferred are orientations of the layers of a multi-layer or a mesh, respectively, that is essentially perpendicular. However, angles of 30°, 45°, 60° between these essential orientations provide particular advantages in respect to the uptake of forces or other mechanical properties of a multi-layer or a mesh, respectively. Preferably, within a casing and/or wall, several of the second strand-like entities are arranged in the direction of tensile forces. Preferably, between two of these second strand-like entities, also a significant distance in regard to the respective diameter prevails. Preferably, several second strand-like entities are folded together in the shape of a web.

Preferably, at least one second device for conducting electrical current is assigned to the wall. The second device for conducting electrical current is at least indirectly electrically connected with a galvanic cell or a group of galvanic cells. Preferably, a second device for conducting electrical current is assigned to the wall of each galvanic cell or each group of galvanic cells. Preferably, such a second device for conducting electrical current is provided as a metallic flat lead, which is at least partially enclosed by the wall. Also, the second device for conducting electrical current can be arranged on the outer surface of the wall. In a particular preferred embodiment, the device for conducting electrical current is connected in material engagement with the wall. Preferably, the device for conducting electrical current is at least electrically isolated with respect to the environment. In case the wall of the accumulator is destroyed or at least partially damaged, with a high probability, also one of the second devices for conducting electrical current is damaged. Subsequently, energy can no longer be exchanged with a galvanic cell or a group of galvanic cells.

Preferably, said at least one second device for conducting electrical current is made of a material that has a lower degree of elongation at fracture than the materials of the wall. Preferably, this at least one second device for conducting electrical current is connected in material engagement with the wall. In case the wall stretches or deforms, preferably the conductive cross-section of the second device for conductive electrical current diminishes. Thereby, the respective electrical resistance increases. In case the wall stretches significantly—assuming that the material or the geometry, respectively, is suitably selected—the second device for conducting electrical current ruptures as a consequence. A second device for conducting electrical current particularly preferably comprises at least one thin area that is arranged in a part of the wall that is capable of stretching in a particularly pronounced manner. Thereby, the second device for conducting electrical current ruptures prior to failure of the wall, After rupturing a second device for conducting electrical current, it is no longer possible to exchange electrical energy with the galvanic cell or the group of galvanic cells. This is advantageous in case the wall strongly deforms, for example as a consequence of strong mechanical impact.

Preferably, the wall comprises at least one second sensor device. Preferably, said second sensor device is to be understood, for example, to include a temperature measuring device, a piezo-element, a resistance strain gauge or any other measuring device providing information about an unwanted status of operation of a galvanic cell or the wall. This also may be a device that is arranged on the outer surface of the wall and that reacts to the presence of chemicals from the inner parts of the cell. Preferably, the second sensor device is connected in material engagement with the wall. Preferably, a second sensor device is connected to a memory device or control unit, respectively. The same may be assigned to the wall as well as to the accumulator.

Preferably, an accumulator comprises at least one dampening device. The dampening device serves the purpose of diminishing potentially damaging consequences of mechanical impact on the galvanic cells of the accumulator. The mechanical impact may be an oscillating impact and/or shock impact. Preferably, the dampening device is suitable for absorbing energy by means of deforming. Therein, the dampening device shows elastic and/or viscous behavior as a response to an impact. In response to a sufficiently small impact, the dampening device exclusively responds with elastic deformation. At a higher degree of impact, the dampening device is also deformed in a viscous manner. Preferably, the dampening device is arranged between the wall of the accumulator and the at least one galvanic cell. Particular preferred is an arrangement in which the dampening device is arranged in the direction of the expected mechanical impact.

Further advantages, features and applications of the present invention can be taken from the following description in the context of the Figures. The Figures show:

FIG. 1 Side view of the galvanic cell according to the invention.

Figure 2:
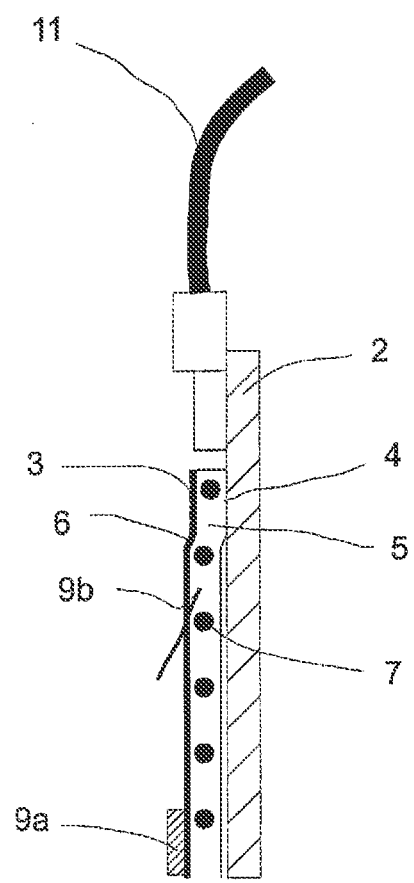

FIG. 2 Side view perpendicular relative to FIG. 1 with a partial segment of a galvanic cell according to the invention.

FIG. 1 shows a preferred embodiment of a galvanic cell according to the invention. Current conductor 2 partially protrudes from casing 3. Current conductor 2 is realized as a copper foil and is in electrical operational engagement with an active electrode mass that is inside the casing 3 (not shown). Casing 3 is present as a multi-layer of foils. Casing 3 comprises a first layer 5 of polyethylene foil as well as a second layer (not shown) of aluminum foil. The outer layer also counteracts the entry of water or water vapor in the inner part of the galvanic cell. The first layer 5 of polyethylene foil is arranged on the inside of the outer layer and separates the outer layer from the chemicals of the galvanic cell 1. The casing 3 has the shape of a pouch and is closed along three edges. The inner parts of the galvanic cell 1 are inserted via the open fourth edge. The casing 3 comprises a contact area 4. Within this contact area 4, the casing 3 is connected with a current conductor 2 in material engagement. The connection was achieved by means of a ultra sonic welding process. Thereby, no water or water vapor can enter the inner part of the galvanic cell 1, also not by means of the open fourth edge of the casing 3. Furthermore, the chemically acting parts of the galvanic cell cannot leak out of the casing 3.

Strand-like entities 7 are embedded into the first layer 5. Said first strand-like entities are an open-pore mesh or web of glass fibers that are essentially oriented in the direction of tensile forces that may occur. This web of first strand-like entities 7 serves the purpose of up-taking tensile forces. These also occur when casing 3 stretches, for example as the consequence of a significant increase in temperature or gas formation inside the galvanic cell 1. The first strand-like entities 7 counteract this stretching.

Furthermore, the embodiment shown comprises two first devices for conducting electrical current made of copper stripes. These first devices for conducting electrical current 8 are connected with the casing 3 in material engagement and are arranged on one of the outer surfaces of casing 3. According to the representation, these first devices for conducting electrical current 8 are connected with each other at their respective upper ends with current conductor 2 in an electrically conducting manner. The further conducting path to the electrical consumer load is not shown. Each of the first devices for conducting electrical current 8 is provided with a thin area 10. The same serves the purpose to preferably fail in case of strong heating or stretching. The first devices for conducting electrical current 8 are at least electrically insulated as well vis-à-vis casing 3 and vis-à-vis the environment.

FIG. 2 shows a part of a galvanic cell 1 according to the invention in a cross-sectional representation. Shown are a current conductor 2 (cross-hatched) of the galvanic cell 1, the casing 3 thereof, the feed wiring 11, instead of a first device for conducting electrical current, and two first sensor devices (9a, 9b). Casing 3 comprises a first layer 5 and a second layer 6. The second layer 6 is realized as an aluminum foil. The first layer 5 comprises two materials, a hardenable polymer as well as a mesh of first strand-like entities 7. In the connecting area 4, casing 3 is connected with the current conductor 2 in material engagement. The contact area 4 is realized as a small strip and as an adhesive connection. Outside this contact area 4, casing 3 only contacts current conductor 2 or the other parts of the galvanic cell 1, respectively.

Within the first layer 5, a thermocouple 9b is provided. The first sensor device 9a serves the purpose of determining whether electrolyte has leaked out of the inner parts of the cell and through casing 3. Said first sensor unit 9a is preferably connected with the lower part of casing 3 and in material contact with the same. Both first sensor units 9a and 9b are connected with a device for storing of signals from the first and second sensor unit (not shown) of the accumulator. This memory device is connected with a device for data transfer. Upon reaching measured values that are seen as critical, the transmitting of a warning signal is possible.

The invention claimed is:

1. Galvanic cell, comprising:
a current conductor;
a casing which at least partially surrounds the galvanic cell; and
a contact area that is assigned to the casing, in which the casing is at least partially connected with the current conductor,
wherein
the casing comprises at least one first layer and one second layer,
the material of the first layer and the material of the second layer are different from each other in respect to at least one chemical substance
at least one of the layers of the casing comprises at least one first material and at least one second material,
the second material has a higher module of elasticity than the first material,
the second material is realized in the shape of fibers,
the fibers are connected with the first material at least partially in material engagement,
the fibers are at least partially connected with each other forming a first elongated entity, and
a plurality of said first elongated entities are essentially arranged in the direction of a tensible force.

2. The galvanic cell according to claim 1, wherein at least one first device for conducting electrical current is assigned to the casing.

3. The galvanic cell according to claim 2, wherein the at least one device for conducting electrical current has a lower degree of elongation at fracture than the casing.

4. The galvanic cell according to claim 1, wherein at least one first sensor device is assigned to the casing.

5. An accumulator, comprising:
at least one galvanic cell according to claim 1; and
a wall which at least partially surrounds the at least one galvanic cell.

6. The accumulator according to claim 5, wherein the wall comprises at least one third material and at least one fourth material.

7. The accumulator according to claim 5, wherein:
the fourth material has a higher module of elasticity than the third material;
the fourth material is realized in the shape of fibers;
the fibers are at least partially connected in material engagement with the third material;
the fibers are connected with each other, at least partly, in a second elongated entity; and
several second elongated entities are arranged in the direction of a tensile force.

8. The accumulator according to claim 5, wherein the wall comprises at least one second device for conducting electrical current, which is at least partially surrounded by the wall.

9. The accumulator according to claim 5, wherein the at least one second device for conducting electrical current has a lower degree of elongation at fracture than the wall.

10. The accumulator according to claim 5, wherein at least one second sensor unit is assigned to the wall.

11. The accumulator according to claim 5, further comprising at least one dampening unit assigned to the at least one galvanic cell.

* * * * *